Patented Feb. 13, 1951

2,541,153

UNITED STATES PATENT OFFICE 2,541,153

METHOD OF DECARBURIZING HIGH-CARBON FERROCHROMIUM

Cecil G. Chadwick, Niagara Falls, N. Y., assignor to Union Carbide and Carbon Corporation, a corporation of New York No Drawing. Application April 12, 1949, Serial No. 87,113

4 Claims. (Cl. 75—28)

The invention relates to the production of ferrochromium, an alloy of iron and chromium in which the content of chromium preferably is within the range of 60% to 75% but may, for special purposes, be as low as 50% or as high as 99%. Silicon also may be present in amounts up to 25%.

In the production of many chromium-containing iron alloys it is highly desirable to employ ferrochromium having a very low carbon content. In the present state of the art ferrochromium of low-carbon content is prepared by a silicon reduction process. The raw materials employed consist primarily of chromium ore, silicon or a silicon alloy, and fluxing agents. The manufacturing operation is conducted in the molten state, generally in an open-arc electric furnace. The reduction of the chromium ore proceeds in accordance with the following equation:

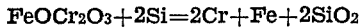

$$FeOCr_2O_3 + 2Si = 2Cr + Fe + 2SiO_2$$

As an alternative to the above procedure it has been proposed to prepare low-carbon ferrochromium by vacuum decarburization of high-carbon ferrochromium with an oxidant, both being in the solid state. Among oxidants which may be employed in such a process are metal oxides such as chromium oxide, iron oxide, and manganese oxide, or oxygen-bearing salts such as carbonates. In this procedure, high-carbon ferrochromium and the selected oxidant material in an amount sufficient to effect the desired decarburization are first comminuted to extreme fineness, i. e. preferably below 30 microns particle size and then thoroughly mixed. After mixing, the comminuted material is formed into pellets to provide contact between reacting particles and also the necessary interstitial space for the escape of reaction gases.

In the vacuum decarburization of high-carbon ferrochromium high rates of reaction are desirable to decrease the total time during which the charge has to remain in the furnace. This condition may be achieved by increasing the temperature of the reacting materials. However, a limitation is imposed by the incipient melting temperature of the high-carbon ferrochromium in the pellets. Initial furnace temperatures above the incipient melting temperature result in partial fusion of the charge, thus bringing the reaction to a premature conclusion by sealing the interstitial regions of the pellets and blocking the escape of evolved reaction gases.

As an example of this effect it has been observed that when pellets composed of high-carbon ferrochromium containing about 70% chromium and 4% or more of carbon in admixture with a suitable oxidant are heated at temperatures above the solidus temperature of the high-carbon ferrochromium but below 1300° C. incipient fusion of the high-carbon ferrochromium occurs. This effect becomes more pronounced as the carbon content of high-carbon ferrochromium decreases to the eutectic composition of the alloy which is about 2.7% carbon. As a result of such fusion a skin is formed on the pellets which prevents further effective decarburization of the interior. The interior of the pellets after such treatment appears to be composed of a stonelike, unreacted mixture. To avoid this objectionable effect, the pellets may be decarburized at temperatures below 1265° C. but at these lower temperatures the time of the decarburization treatment is undesirably prolonged.

It is an object of the present invention to provide a process wherein the solid phase decarburization of high-carbon ferrochromium may be performed at initially higher temperatures and with faster reaction rates than heretofore without detrimental effect.

It is a further object to eliminate the necessity for fine grinding of the high-carbon ferrochromium prior to its decarburization.

Another object is to provide a method wherein the mixing operation is enhanced by the fact that similar materials are being blended.

The present invention is an improvement in the method for the solid phase decarburization of high-carbon ferrochromium. The method comprises partially oxidizing moderately coarse high-carbon ferrochromium particles to provide an average oxygen to carbon ratio greater than 1.3 and to obtain a refractory shell of oxide on most of the individual particles. The refractory shell serves to supply oxygen for reaction with the carbon in the interior of the particles and also, because of its high melting point, enables the particles to be heated at temperatures above the fusion point of the core during the decarburizing reaction without surface fusion of the particles. The material so prepared is then heated to the desired higher reaction temperature in vacuo to expedite its decarburization at a rate heretofore impracticable. The material preferably is pelleted prior to the decarburization treatment. Any suitable binder may be employed. Glucose and molasses have been found to be satisfactory for this purpose.

The following comparative tests show the advantage of the method of the present invention in preventing "skinning" of pellets during rapid high temperature decarburization over methods wherein comminuted high-carbon ferrochromium and an oxidant are present as discrete particles within each pellet. In the tests, a pellet made according to the method of the present invention was prepared from surface oxidized ferrochromium.

In the preparation of the pellet, comminuted high-carbon ferrochromium containing 4.47% carbon was subjected to a water separation to remove powder of extreme fineness. A screen test of the remainder by analysis was:

5.0% on 100 mesh (0.0058 inch openings)
13.6% on 150 mesh (0.0041 inch openings)
13.6% on 200 mesh (0.0029 inch openings)
52.5% on 325 mesh (0.0017 inch openings)
15.0% through 325 mesh The material from the foregoing screen analysis was heated at a fluidized bed (bottom air inlet) at 1100° C. for one hour. Analysis of the product showed 3.92% carbon, 6.62% oxygen. Pellet No. 1 was prepared from this product using glucose as a binder.

Pellet No. 2 was made from a mixture of finely comminuted oxidized ferrochromium and high-carbon ferrochromium. This same mixture had resulted in a final carbon content of 0.02% in previous tests wherein the temperature of decarburization had been about 1300° C. for about 20 hours.

In the comparative test Pellet No. 1 and Pellet No. 2 were heated simultaneously, in vacuo, from an initial tempertaure of 20° C. to 1400° C. in 2¾ hours and then held at 1400° C. for 5 hours. Examination of the pellets after the test showed that Pellet No. 2 had "skinned," and in fracture was fused at its center; whereas Pellet No. 1 had neither "skinned" nor fused. After the test the carbon content of Pellet No. 2 was 0.15% showing incomplete decarburization. Pellet No. 1, however, made according to the invention contained only 0.02% carbon.

If surface oxidation of the high-carbon ferrochromium is accurately controlled with respect to particle size, time and temperature, it is possible to obtain the correct average ratio of oxygen to carbon to give substantially complete decarburization without the further addition of oxidizing agent. However, a simpler procedure involves mixing two or more batches of partially oxidized high-carbon ferrochromium to obtain a blend having the desired ratio of oxygen to carbon and preparing the pellets to be decarburized from the blended material.

In the method of the present invention particles of about 30 micron average size are not required, and particles having diameters five times greater have been found entirely satisfactory.

What is claimed is:

1. Method for decarburizing high-carbon ferrochromium which comprises comminuting said high-carbon ferrochromium, partially oxidizing the comminuted high-carbon ferrochromium so formed to provide an average oxygen to carbon ratio greater than 1.3 and to form a refractory surface on the particles thereof, and heating said partially oxidized high-carbon ferrochromium under sub-atmospheric pressure at a temperature below the fusion temperature of said refractory surface for a time sufficient to effect decarburization.

2. A method for decarburizing high-carbon ferrochromium as claimed in claim 1 in which said partially oxidized high-carbon ferrochromium is pelleted prior to said heating step.

3. A method for decarburizing high-carbon ferrochromium as claimed in claim 1 wherein the heating of said partially oxidized high-carbon ferrochromium is at a temperature between about 1300° C. and 1400° C.

4. In the vacuum decarburization of high-carbon ferrochromium in the solid state by heating pellets composed of comminuted high-carbon ferrochromium and an oxidant under sub-atmospheric pressures at a temperature sufficient to promote reaction but below the fusion point of the high-carbon ferrochromium; the improvement enabling more rapid decarburization of said high-carbon ferrochromium and the employment of higher temperatures in said decarburization step without preventing escape of carbonized gas from said pellets by the superficial fusion of said high-carbon ferrochromium which improvement comprises preliminarily oxidizing said comminuted high-carbon ferrochromium to provide an average oxygen to carbon ratio greater than 1.3 and to form a refractory surface on the particles thereof, pelleting the refractory coated particles so formed, and rapidly heating said pellets to a temperature slightly below the fusion temperature of the refractory coating on said high-carbon ferrochromium thereby effecting more rapid decarburization of said pellets than possible in pellets wherein unoxidized high-carbon ferrochromium of equivalent carbon content is a constituent of said pellets.

CECIL G. CHADWICK.

REFERENCES CITED

The following references are of record in the file of this patent:

FOREIGN PATENTS

| Number  | Country       | Date          |
|---------|---------------|---------------|
| 514,491 | Great Britain | Nov. 9, 1939  |
| 516,867 | Great Britain | Jan. 15, 1940 |